United States Patent [19]
Colvin et al.

[11] Patent Number: 5,637,389
[45] Date of Patent: Jun. 10, 1997

[54] THERMALLY ENHANCED FOAM INSULATION

[76] Inventors: David P. Colvin, 123 Harmony Hill La., Cary, N.C. 27513; Yvonne G. Bryant, 316 Lord Berkley Rd., Raleigh, N.C. 27610

[21] Appl. No.: 616,532

[22] Filed: Mar. 19, 1996

Related U.S. Application Data

[63] Continuation-in-part of Ser. No. 275,226, Jul. 13, 1994, Pat. No. 5,499,460, which is a continuation-in-part of Ser. No. 129,490, Sep. 30, 1993, abandoned, which is a continuation of Ser. No. 837,762, Feb. 18, 1992, abandoned.

[51] Int. Cl.$^6$ .................. B32B 1/02; B32B 1/06; B32B 5/16; B32B 5/18
[52] U.S. Cl. .................. 428/308.4; 2/2.16; 2/5; 206/523; 206/524; 206/524.6; 220/1.5; 220/902; 264/45.3; 264/46.5; 297/DIG. 1; 426/109; 426/127; 428/71; 428/95; 428/317.9; 428/320.2
[58] Field of Search .................. 428/317.9, 320.2, 428/322.7, 913, 920, 308.4, 310.5; 206/523, 524; 264/45.3, 46.5

[56] References Cited

U.S. PATENT DOCUMENTS

| | | | |
|---|---|---|---|
| 4,756,958 | 7/1988 | Bryant et al. | 428/320.2 |
| 5,366,801 | 11/1994 | Bryant et al. | 428/283 |
| 5,499,460 | 3/1996 | Bryant et al. | 428/320.2 |

*Primary Examiner*—James C. Cannon
*Attorney, Agent, or Firm*—Rosenthal & Putterman

[57] ABSTRACT

A thermal barrier in the form of a base material with a plurality of microcapsules containing a phase change material forms an insulative pad, such as a shoe insole. The microcapsules are surroundingly encapsulated and embedded within the base material. In addition, substantially all of the microcapsules are spaced apart from each other, the space between neighboring adjacent microcapsules containing a phase change material. The microcapsules may be anisotropically distributed to further reduce thermal conductivity of heat through the thermal barrier.

18 Claims, 2 Drawing Sheets

THERMALLY ENHANCED FOAM INSULATION

This application is a continuation-in-part of U.S. patent application Ser. No. 08/275,226 filed Jul. 13, 1994 (now U.S. Pat. No. 5,499,460), which is a continuation-in-part of U.S. patent application Ser. No. 08/129,490 filed Sep. 30, 1993, now abandoned, which is a continuation application of U.S. patent application Ser. No. 07/837,762 filed Feb. 18, 1992, now abandoned.

FIELD OF THE INVENTION

This invention relates generally to the field of foamed insulation materials and more particularly to insulation materials for use in a variety of application such as insulated containers, automotive interiors (i.e., seats, steering wheels, dashboards, headliners, carpet pads), meal delivery systems, footwear insulation, clothing (i.e., turn-out gear for use in fire fighting, bullet-proof vest liners, footwear liners, underwater dive suits, helmet liners), food packaging, protective packaging of other perishables and insulated bulkheads.

BACKGROUND OF THE INVENTION

The rate of thermal exchange between a person and the environment is dependent upon a number of factors, such as activity level, the nature and condition of the environment, and the characteristics of the clothing (such as a shoe) having contact with the wearer's skin. The transfer of body heat from the skin through clothing or footwear to the environment takes place by conduction, convection, radiation and evaporation, the physiological details and mechanisms of which are generally well known.

In clothing (i.e., footwear), conduction or convection from the body through the clothing to the environment is the main mode of heat loss from the body to the outer surface of clothing. Thermal energy is principally transferred by conduction through the clothing, and is thereafter transferred by conduction or convection as well as radiation from the clothing to the environment. Given the propensity for the extremities to easily become cold, it would therefore be of commercial value to improve the insulating capacity of clothing.

In addition to the foregoing, many commodities and products are sensitive to changes in temperature. Providing an isothermal environment or preventing temperature extremes during shipment would thus enhance or maintain the condition of the product upon delivery to the retailer or the consumer. For example, fresh produce must be maintained at constant temperature or it will wilt. In extreme cases the produce can spoil. Likewise, fresh plants should be maintained within narrow temperature and humidity ranges during transport in order to assure delivery in prime condition. Transportation via truck and/or train may subject the shipped product to wide swings in temperature. For example, in a cross-country shipment, the product may be subject to high desert temperatures during the day and cooler temperatures at night. In addition, the fact that the product is shipped in a closed metal container may exacerbate the total temperature swing. It would therefore be of commercial value if the temperature within shipping containers could be maintained at a constant level. In addition, in other circumstances, it would also be of commercial value if the total temperature swing could be reduced.

The automobile is another area which would benefit from the creation of a more nearly isothermal environment. For example, it is well known that in the summer when a car is parked in the sun, the temperature can rise very quickly to well over 120 degrees fahrenheit. This rapid rise in temperature can cause considerable inconvenience to the owner of the vehicle by having to cool down the passenger compartment of the vehicle, can injure pets that may be left in the vehicle, and will accelerate wear and tear on the interior of the vehicle.

It is, therefore, an object of the present invention to provide an improved thermal management system.

It is another object of the present invention to provide a thermal control material which assists in maintaining an isothermal environment.

It is, therefore, an object of the present invention to provide clothing (i.e., a shoe insole) having enhanced ability to insulate the wearer (foot) from hot or cold.

Yet another object of the present invention is to provide a thermal control material with enhanced insulating properties that also has a high degree of structural integrity.

A still further object of the present invention is to provide a thermal control material having enhanced thermal storage properties that is reusable.

SUMMARY OF THE INVENTION

In accordance with the present invention, there is provided a thermal control material having thermal energy storage and insulative properties for use as a thermal barrier between a heat source and a heat sink. The thermal control material comprises a foam base material forming an insulative pad. A plurality of microcapsules containing a phase change material are dispersed throughout the foam base material such that the microcapsules are individually surroundingly encapsulated and embedded within the base material such that the microcapsules are spaced apart from each other, and further, the space between neighboring adjacent microcapsules contains base material.

In a second embodiment of the invention, an insole is adapted to be removably positioned within an article of footwear to insulate the foot from heat or cold and provide auxiliary heat from stored energy. The insole comprises a flexible resilient foam base material forming a pad. A plurality of microcapsules are integral with and dispersed throughout at least a portion of the base material and contain a temperature stabilizing means, such as a phase change material, for example, paraffinic hydrocarbons. The microcapsules are individually surroundingly encapsulated and embedded within the base material. Substantially all of the microcapsules are spaced apart from each other and the space between neighboring adjacent microcapsules is base material. Furthermore, the insole may include an anisotropic distribution of particles such that they are concentrated closer to the plantar region of the foot. Alternatively, the insole may be multilayered, with the upper layer containing microcapsules and the lower layer a microcapsule free insulator.

In an alternate embodiment of the invention, the thermal control material is incorporated into clothing. More specifically, a foam base material forming an insulative pad is provided. A plurality of microcapsules containing a phase change material are dispersed throughout the foam base material such that the microcapsules are individually surroundingly encapsulated and embedded within the base material. The foam is formed such that the microcapsules are spaced apart from each other, and further, such that the space between neighboring adjacent microcapsules contains base material. Fabric layers are attached to one or both sides of the foam, depending on the particular application involved.

In another embodiment of the invention, the thermal control material is incorporated into packaging materials. The thermal control material in this instance comprises a foam base material forming an insulative pad. A plurality of microcapsules containing a phase change material are dispersed throughout the foam base material such that the microcapsules are individually surroundingly encapsulated and embedded within the base material. The foam is formed such that the microcapsules are spaced apart from each other, and further, such that the space between neighboring adjacent microcapsules contains base material. The thermal control material may be placed between the walls of any type of container. For example, the container may comprise a large container such as a truck cab, truck trailer, aircraft skin and the like. On the other hand, the container may comprise a conventional shipping box, styrofoam container and the like. It will also be noted that the foam base material can be incorporated into various components of an automobile interior such as the seat, steering wheel, dashboard or carpet padding.

BRIEF DESCRIPTION OF THE DRAWINGS

Some of the objects of the invention having been stated, other objects will appear as the description proceeds when taken in connection with the accompanying drawings in which.

DETAILED DESCRIPTION OF THE PREFERRED EMBODIMENTS

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

The insole generally indicated at 10 is adapted to be removably positioned within an article of footwear (not shown) to insulate the foot from heat or cold and comprises a flexible resilient base material forming a pad. A plurality of leak resistant microcapsules 20 (indicated by the dark dots in FIGS. 3 & 4) are integral and dispersed throughout the base material. The microcapsules 20 are individually surroundingly encapsulated and embedded within the base material. In addition, substantially all of the microcapsules 20 are spaced apart from each other, the space between neighboring adjacent microcapsules being base material. The microcapsules contain a temperature stabilizing means 30.

Figure 1:
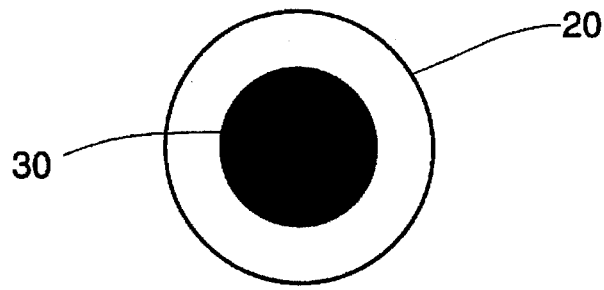
FIG. 1 is a cross section of a microcapsule according to the present invention containing a phase change material.
Figure 2:
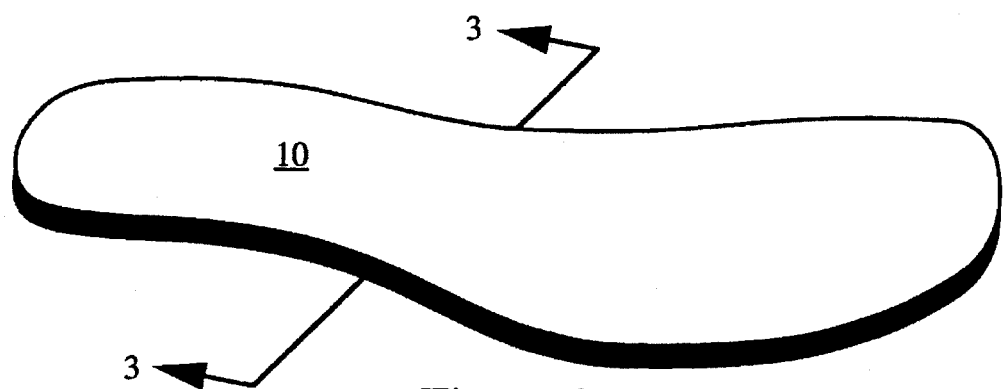
FIG. 2 is a perspective view of an insole according to the present invention.
Figure 3:
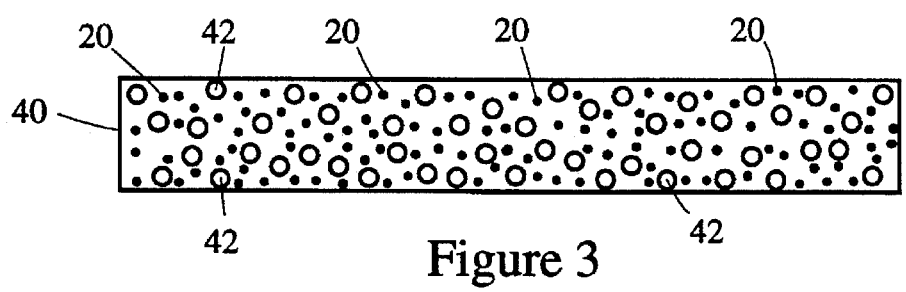
FIG. 3 is a sectional view of an insole according to the present invention taken along line 3—3 of FIG. 2 wherein microcapsules are embedded within a foam.
Figure 4:
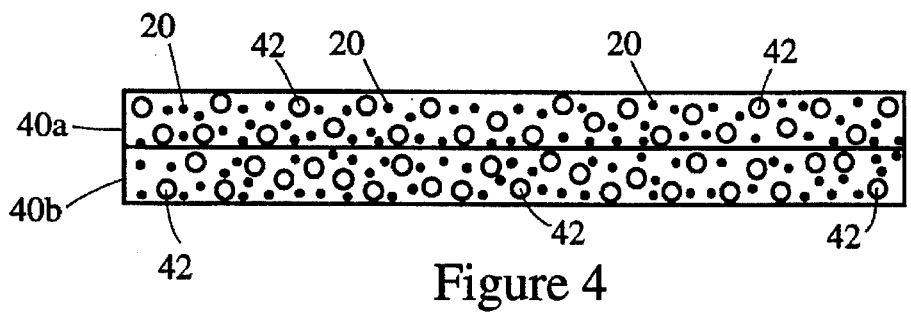
FIG. 4 is a sectional view taken along line 3—3 of FIG. 2 of a second embodiment of the insole according to the present invention wherein microcapsules are anisotropically embedded within a foam comprised of two layers.
Figure 5:
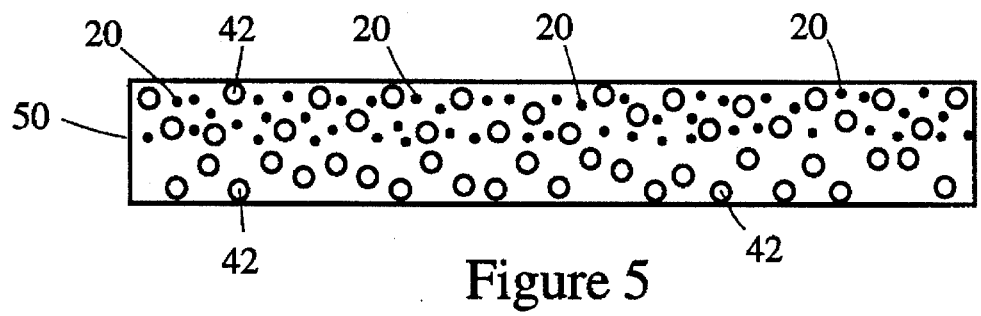
FIG. 5 is a sectional view taken along line 3—3 of FIG. 2 of a third embodiment of the insole according to the present invention wherein microcapsules are anisotropically embedded within a single layer foam.

The base material forming the pad is a polymeric material such as a moldable foamed organic plastic 40. The air cells 42 are schematically illustrated in FIGS. 3 & 4 as the circular white dots. Exemplary of acceptable polymers employed in the footwear industry are polyurethane, ethylene/vinyl acetate (EVA) copolymer, latex, polyethylene, polypropylene, butyl, silicone, cellulose acetate, neoprene, epoxy, polystyrene, phenolic, and polyvinyl chloride (PVC). The foregoing may be foamed or not, depending on the particular material selected. The foam may also be closed cell or open cell, again depending on the particular application.

The microcapsules 20 can range in size from about 1.0 to about 1000.0 microns and are formed according to conventional methods well known to those skilled in the art.

The microcapsules contain a temperature stabilizing means or phase change material 30 such as eicosane. Additionally, plastic crystals such as 2,2-dimethyl-1,3-propanediol (DMP) and 2-hydroxymethyl-2-methyl-1,3-propanediol (HMP) and the like may be used as the temperature stabilizing means. When plastic crystals absorb thermal energy, the molecular structure is temporarily modified without changing the phase of the material. For high temperature applications low melting point eutectic metals such as low melting point solders may be employed.

In another aspect of the invention, the composition of the phase change material may be modified to obtain optimum thermal properties for a given temperature range. For example, the melting point of a homologous series of paraffinic hydrocarbons is directly related to the number of carbon atoms as shown in the following table:

| Compound Name | Number of Carbon Atoms | Melting Point Degrees Centigrade |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

In addition to the paraffinic hydrocarbons listed above, other paraffinic hydrocarbons having a greater (or lesser) number of cabon atoms having a higher (or lower) melting point may also be employed in practicing the invention. Each of the above materials can be separately encapsulated and is most effective near the melting point indicated. It will be seen from the foregoing that the effective temperature range of the insole can, therefore, be tailored to a specific environment by selecting the phase change materials required for the corresponding temperature and adding microcapsules containing the material to the insole.

In addition, the insole 10 can be designed to have enhanced thermal characteristics over a wide range of temperature or at discrete temperature ranges through proper selection of phase change material.

In fabricating the insole 10, the desired encapsulated phase change materials are added to the base polymer (liquid or solution) and fabrication is accomplished according to conventional methods which may include foaming. Typical concentrations of microencapsulated phase change particles added to the base polymer material range from about 20% to about 60% by weight. The foregoing concentrations are believed to allow the insole to be subjected to the repeated mechanical stresses of ambulation with minimum changes in the thermal characteristics of the insole. During fabrication, a base material is formed by selecting a liquid polymer and/or elastomer and then causing the foregoing to be foamed. Common methods of foaming include adding a hardening agent which causes a chemical reaction, thermally setting the base material with heat, or bubbling a gas through the liquid polymer/elastomer while hardening, or other methods well known to those skilled in the art. The microcapsules would be added to the liquid polymer/elastomer prior to hardening and mixed therein to ensure wetting and equal dispersion throughout the mixture. After mixing, the microcapsules will be wetted and substantially all will be spaced apart from each other. Thus, when the base material is foamed by the methods described above, the microcapsules will be embedded within a base material matrix so that they are individually surroundingly encapsulated and embedded within the base material and further, the space between neighboring adjacent microcapsules will be base material and not the foaming gas. It is believed that the wetting step coats the microcapsules and that the surface tension of the polymer/elastomer maintains the coating around the microcapsules during and after foaming. In addition, the surface tension of the foamed bubble prevents the PCM particles from crossing the boundary into the bubble. Thus, the gas pockets formed during foaming are substantially free of microcapsules.

It will be noted that the microcapsules embedded within a foam as described above are actually surrounded by two distinct walls. The first being the microcapsule wall itself and the second being the wall formed by the foam. Thus, the propensity for the phase change material to leak out of the insole is substantially reduced. The net result is repeatability of thermal response when the insole is re-used.

In the fabrication of the invention, the microcapsules 20 need not be evenly distributed throughout the entire insole. For example, the microcapsules 20 may be anisotropically distributed so as to concentrate them in the upper portion of the insole in a plane substantially parallel to the underside of the plantar region of the foot. It is believed that the loading or concentration of the particles in the insole would decrease from an initially selected concentration (top being nearest the foot) by one-half as one moves by quartiles away from the top as follows:

| | |
|---|---|
| First quarter of insole | 100% (top) |
| Second quarter of insole | 50% |
| Third quarter of insole | 25% |
| Fourth quarter of insole | 0% (bottom) |

Similarly, the insole may be fabricated in two or more layers 40a, 40b as shown in FIG. 4, only one of which contains microcapsules. These layers are then bonded together using conventional methods with the net result being a concentration of microcapsules 20 proximate the foot embedded in the base material. The various layers 40a, 40b may be of the same or different materials, depending on the particular application. Alternatively, both layers may contain microcapsules to form an additional thermal barrier.

It will be appreciated that the insole according to the invention will have enhanced value if produced to have application in heat as well as cold. For example, the insole 10 could be inserted into footwear which would be cold during winter and hot during summer. Furthermore, a single phase change material can be employed to both heat and cool a shoe. For example, an insole having a PCM selected to melt at higher temperatures can be thermally charged simply by being present in a room proximate a heat source. Thereafter, when in use in a cold environment such as ice or snow, the foot of the user will remain warm for an extended period of time and will protect the foot of the wearer for a substantial period of time beyond that of standard non-PCM containing footwear until the phase change material solidifies. Similarly, in summer, when the same insole is stored in a relatively cool environment, such as within a home or office and is then used, for example, on a hot asphalt roadway, the foot will remain cool until the phase change material melts. A preferred method would be to pre-cool the insole in a conventional refrigerator. Additionally, the insole could be fabricated with microcapsules containing two discrete types of phase change material, one suitable for assisting maintaining the foot of the wearer at each of two desired temperatures.

The insole may be used as a thermal storage device, somewhat similar to a battery. In operation, the user may preheat (or pre-cool) the insole prior to insertion within the article of footwear. Alternatively, the preheating or pre-cooling as the case may be, may be accomplished simply by returning inside after having been out of doors (for example, in the snow when the microcapsules will be recharged from the warmer air present inside, i.e., near a fireplace or other heat source, or recharged for re-use by metabolic heat production during high activity levels).

While the foregoing description makes reference to a shoe insole, the reader will note that the present invention has wide application not only in other areas of the shoe but in many related items of clothing or padding. The present invention contemplates fabrication of the shoe sole from a foam pad produced according to conventional means. Therefore, one method of producing the insoles is in the form of a large flat sheet. The sheet then passes through a punch press which cuts out individual insoles. The reader will note that the sheet may be used as linings in gloves, hats, outerwear, and underwear and the present invention may, therefore, be regarded generally as a thermal barrier.

Figure 6:
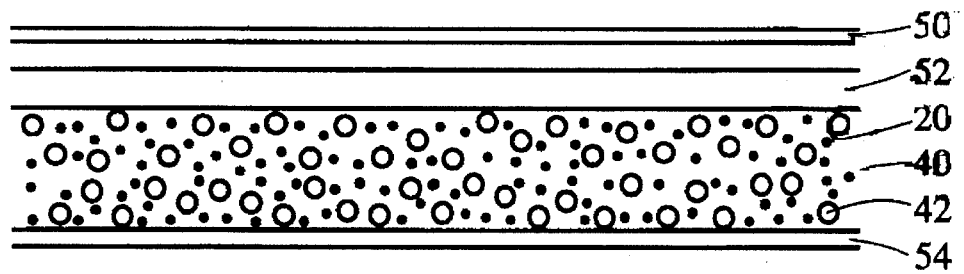
FIG. 6 is a sectional view of a dry suit according to the present invention.
Figure 7:
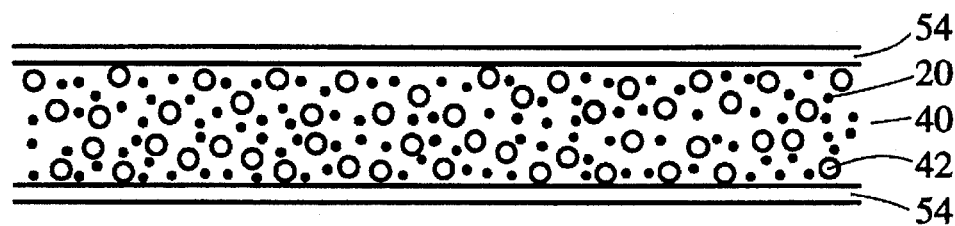
FIG. 7 is a sectional view of a wet suit according to the present invention.

For example, the foam pad produced according to the present invention may be incorporated into a variety of types of clothing that employ a foam layer such as wet and/or dry suits such as are used in scuba diving, marine exposure suits and thermally protective clothing. Referring now to FIGS. 6 and 7 the foam pad 40 according to the present invention is there illustrated. FIG. 6 illustrates a "dry suit" wherein a foam pad 40 fabricated from neoprene or urethane is sandwiched between a layer of Nylon 54 and a layer of Thinsulate 200 (52) which together form the "under garment". A dry suit indicated at 50 is worn over the under garment and comprises a Neoprene foam or a solid coated Nylon 54 layer. A more conventional wet suit is illustrated in FIG. 7 and illustrates the foam pad 40 sandwiched between layers of Nylon. In addition, the foam pad 40 may be molded to form body armor and sports padding which enhance the ability of the wearer to remain cool. The fabrics that are attached to the opposing sides of foam pad 40 may be attached by any conventional means such as glue, fusion, sewing, lamination and equivalents thereof, well known to those skilled in the art.

Figure 8:
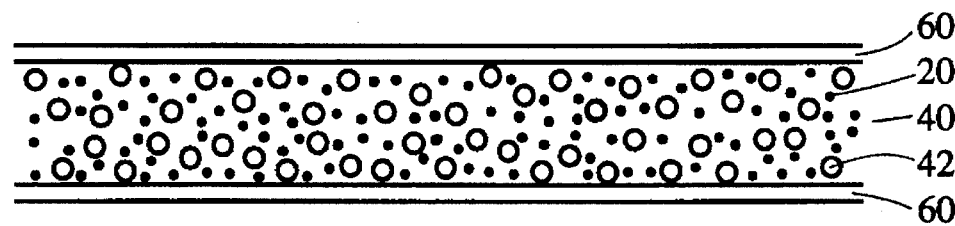
FIG. 8 is a sectional view of a dual wall container filled with the PCM foam according to the present invention.

FIG. 8 illustrates generally the phase change material containing foam 40 positioned between the respective inner and outer walls 60 of a container. The container may be broadly interpreted and may take the form of a cardboard or corrugated box, the walls of a shipping container (such as a trailer, seaboard container, train box car, etc.). The PCM containing foam according to the present invention may also be used as a cushioning structure in addition to a temperature stabilizing means. For example, when packaging fragile items such as electronics, it is common to partially fill a box with a liquid foam. A sheet of protective plastic sheet is then placed over the foam prior to complete solidification thereof. Thereafter, the product is then covered with another layer of plastic sheeting and liquid foam is then used to fill the remainder of space in the box. According to the present invention, microencapsulated phase change material may be added to the constituents of the liquid foam prior to application in order to produce a temperature stabilizing foam. The foregoing concept may be extended from shipping containers to any type of product wherein a foam is employed as a core, for example automobile dash boards, seat cushions and boat floatation foam. Depending on the particular circumstances of use, the presence of the PCM containing foam would operate to slow the rate at which an automobile interior, shipping container, boat hull and the like would experience temperature swings.

In another aspect of the invention, the foam selected as the temperature stabilizing means may be a hydrophilic foam (i.e., a foam that absorbs moisture). The PCM containing hydrophilic foam may be saturated with water prior to use and can be employed to release the stored moisture when in use. Thus, it will be seen that the PCM containing foam has utility when transporting plants or produce that require moisture during shipment in order to remain fresh.

In addition to the uses specified above, the reader will appreciate that the thermal barrier could have additional uses in its sheet form. For example, certain products such as pharmaceuticals must be maintained at or below maximum temperatures. This is often a difficult undertaking when transportation is required. Therefore, the present invention will find application as a thermal "blanket". The blanket is charged by freezing the phase change materials within the microcapsules and may then be wrapped around the product to maintain the temperature thereof.

The foregoing embodiments and examples are to be considered illustrative, rather than restrictive of the invention, and those modifications which come within the meaning and range of equivalence of the claims are to be included therein.

That which is claimed is:

1. A thermal control material having thermal energy storage and insulative properties for use as a thermal barrier when placed between a heat source and a heat sink, and comprising:
   a foam base material forming an insulative pad, and
   a plurality of microcapsules integral with and dispersed throughout said insulative pad and wherein said microcapsules are individually surroundingly encapsulated an embedded within said base material, and further wherein substantially all of said microcapsules are spaced apart from each other, the space between neighboring adjacent microcapsules containing base material, said microcapsules containing a phase change material.

2. A thermal control material according to claim 1 wherein said phase change material is selected from the group consisting of paraffinic hydrocarbons.

3. A thermal control material according to claim 1 wherein said base material is selected from the group consisting of open cell foams, closed cell foams and hydrophilic foams.

4. The thermal control material according to claim 3 further including a planar layer substantially covering one of the respective surfaces of said insulative pad.

5. The thermal control material according to claim 3 further including a planar layer substantially covering the exterior surfaces of said insulative pad.

6. The thermal control material according to claim 4 wherein said planar layer comprises a fabric.

7. The thermal control material according to claim 4 wherein said planar layer comprises one wall of a shipping container.

8. A container characterized by its ability to insulate the contents placed therein from an external environment comprising:
   first and second walls in substantially co-planar spaced relation;
   a foam base material forming an insulative pad positioned between said first and second walls;
   a plurality of microcapsules integral with and dispersed throughout said base material, and wherein said microcapsules are individually surroundingly encapsulated and embedded within said base material, and further wherein substantially all of said microcapsules are spaced apart from each other, the space between neighboring adjacent microcapsules comprising base material, said microcapsules containing a phase change material;
   whereby the container exhibits enhanced thermal stability and thermal insulation properties.

9. The container according to claim 8 wherein the respective first and second walls comprise a paper board.

10. The container according to claim 8 wherein the respective first and second walls comprise cardboard.

11. The container according to claim 8 wherein the respective first and second walls comprise the walls of a metal shipping container.

12. The container according to claim 11 wherein the metal shipping container is selected from the group consisting of railroad cars, truck trailers, and sea board containers.

13. The container according to claim 8 wherein the respective first and second walls comprise plastic.

14. A thermal wrap having thermal energy storage and insulative properties for use as a thermal barrier between a heat source and a heat sink, and comprising:
   a flexible, resilient foam base material forming an insulative pad;
   a plurality of microcapsules integral with and dispersed throughout said insulative pad and wherein said microcapsules are individually surroundingly encapsulated and embedded within said base material, and further wherein substantially all of said microcapsules are spaced apart from each other, the space between neighboring adjacent microcapsules containing base material, said microcapsules containing a phase change material; whereby the thermal wrap assists in maintaining a thermal barrier between the heat source and the heat sink.

15. The thermal wrap according to claim 14 wherein said phase change material is selected from the group consisting of paraffinic hydrocarbons.

16. The thermal wrap according to claim 15 wherein said microcapsules are anisotropically distributed longitudinally within said base material.

17. A method of stabilizing the temperature of an item comprising the steps of:

(a) thermally charging a foam of the type having a base material and a plurality of microcapsules containing a phase change material distributed within the base material in a manner so that the microcapsules are surroundingly encapsulated and embedded within the base material and further wherein substantially all of the microcapsules are spaced apart from each other, the space between neighboring adjacent microcapsules comprising base material, to a temperature where the phase change material melts;

(b) surrounding the item with the thermally charged foam whereby the foam forms a barrier between the item and the external environment and extended thermal protection is provided thereto.

18. The method according to claim 17 wherein said microcapsules are anisotropically distributed so that they are concentrated in the upper portion of the foam in a plane substantially parallel to the item.

* * * * *